United States Patent [19]

Ogle, Jr.

[11] 4,230,148
[45] Oct. 28, 1980

[54] CHECK-VALVE CONSTRUCTION

[75] Inventor: Francis H. Ogle, Jr., Chardon, Ohio

[73] Assignee: De Laval Turbine Inc., Princeton, N.J.

[21] Appl. No.: 27,845

[22] Filed: Apr. 6, 1979

[51] Int. Cl.³ .............................................. F16K 15/03
[52] U.S. Cl. .................................. 137/512.1; 137/527
[58] Field of Search ................... 137/512.1, 527, 527.2, 137/527.4, 527.6, 527.8

[56] References Cited

U.S. PATENT DOCUMENTS

| | | | |
|---|---|---|---|
| 1,286,672 | 12/1918 | Lindgren | 137/527.4 X |
| 2,877,792 | 3/1959 | Tybus | 137/512.1 |
| 3,538,946 | 11/1970 | Hilsheimer | 137/512.1 |
| 3,678,958 | 7/1972 | Satterwhite et al. | 137/512.1 |
| 4,043,358 | 8/1977 | Sliski | 137/512.1 |
| 4,079,751 | 3/1978 | Partridge et al. | 137/512.1 |

*Primary Examiner*—William R. Cline
*Attorney, Agent, or Firm*—Hopgood, Calimafde, Kalil, Blaustein & Lieberman

[57] ABSTRACT

The invention contemplates a check-valve construction wherein two generally semi-circular valve members are hinged to a diametrically extending seat post which divides the bore of the check-valve body into two valve-seat openings, for separate check-valve action with the respective seat openings. In the form described a single hinge connection of both valve members is made to a downstream offset carried at the mid-point of the seat post.

11 Claims, 4 Drawing Figures

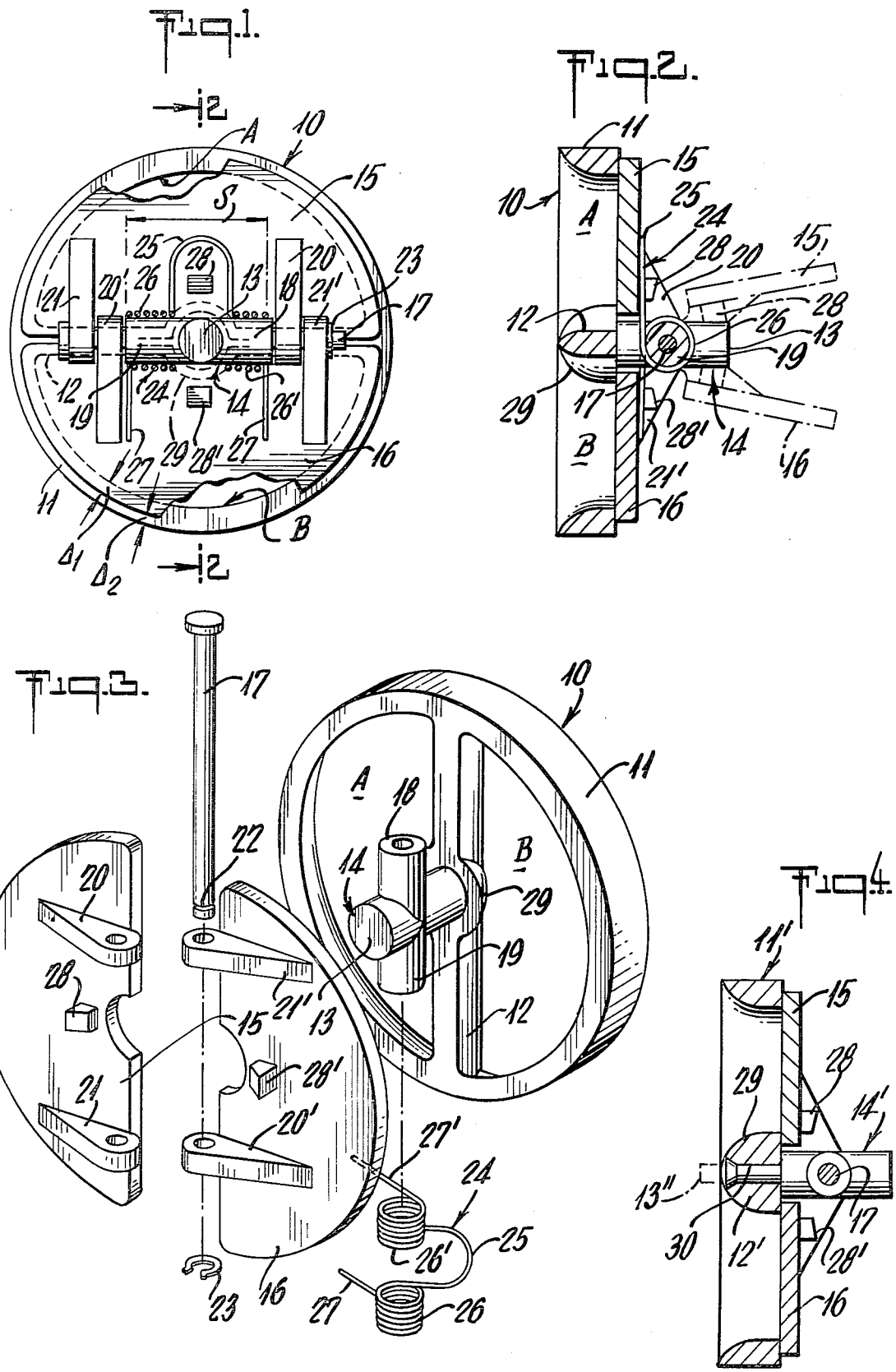

CHECK-VALVE CONSTRUCTION

BACKGROUND OF THE INVENTION

The invention relates to check-valves of the variety in which two like valve members are hinged on a single axis, for independent coaction with the respective valve-seat openings defined by a seat post which extends diametrically across the bore of the valve body. Check valves of this character are illustratively described in U.S. Pat. No. 2,877,792 (Tybus), No. 3,538,946 (Hilsheimer), No. 3,678,958 (Satterwhite et al.), and No. 4,079,751 (Partridge et al.).

In the foregoing patents and in all other similar check-valves known to me, the hinge structure for the two valve members extends fully across the diameter of the valve-body opening and requires special machining of the body and/or added parts to be assembled to the bore of the body, for accommodation of the hinge structure.

SUMMARY OF THE INVENTION

It is an object of the invention to provide an improved check-valve construction of the character indicated, featuring simplicity of construction and maintenance, and improved performance, as compared to existing constructions.

A specific object is to achieve the above object with a construction having inherently improved flow-accommodating properties, for a valve of given size.

Another specific object is to achieve the above objects with a construction having a valve-body thickness of minimum proportions, to enable selective installation of a check-valve function by inserted fitting of the valve in the bore of a conduit, pipe or hose fitting.

Another specific object is to provide for such a valve a valve-member suspension which is spaced from and therefore essentially independent of the valve-body shell per se.

The invention achieves the foregoing and other objects and features by providing hinged suspension of the valve members directly from the seat post, and by having the end-to-end extent of the hinge suspension terminate short of the respective ends of the seat post. Preferably, a single centrally limited hinge means serves both valve members and has substantial radial clearance with the bore of the valve body.

DESCRIPTION OF THE PREFERRED EMBODIMENTS

Preferred embodiments of the invention will be described in connection with the accompanying drawings, in which:

FIG. 1 is a view in elevation of a check-valve of the invention, as viewed from the downstream end;

FIG. 2 is a longitudinal sectional view, taken at 2—2 in FIG. 1;

FIG. 3 is an exploded perspective view of valve-body and valve-member components of the valve of FIG. 1; and FIG. 4 is a view similar to FIG. 2 to show a modification.

In FIGS. 1 to 3, the invention is shown in application to a check-valve comprising a body 10 having a cylindrically annular shell 11 with a cylindrical bore which is divided into two like generally semi-cylindrical seat openings or ports A-B, by means of a seat post 12 which extends diametrically across the bore and is preferably integral with the shell 11. Also integral with seat post 12 and body shell 11 is an axial offset or stem 13 of hinge-post means 14 which projects downstream from the mid-section of seat post 12. The hinge-post means 14 establishes a hinge axis, parallel to the seat post 12 and at downstream offset from the valve-seating plane, established by the flat downstream end of body shell 11. Two like generally semi-circular valve members 15-16 are connected by a single pintel 17 to the hinge-post means 14 for independent articulation about the hinge axis, and in the closed or valve-checking position, valve members 15-16 will be understood to peripherally continuously lap all seating surfaces of shell 11 and seat post 12 in the seating plane.

As shown, the hinge-post means 14 integrally includes transversely aligned radially outward arms 18-19, and a single bore through these arms and stem 13 establishes the hinge axis and is sized to accommodate insertion of pintel 17. The end-to-end span of arms 18-19 need not be great to establish a single and adequate body reference for the hinge axis; preferably, this span S is less than the radius of the bore of shell 11, as shown, and arms 18-19 are cylindrical about the hinge axis. In view of the downstream offset of the hinge axis from the seating plane, the backsides of valve members 15-16, which may be duplicates of each other, are provided with integral hinge lugs 20-21 (20'-21') to achieve seating offset accommodation. As shown, for each valve member 15(16), one hinge lug 20(20') is at a first (lesser) radial offset from the valve axis, and the other hinge lug 21(21') is at a second (greater) radial offset from the valve axis, to the end that when assembled to arms 18-19 via pintel 17, the lugs 20-21 (20'-21') of both valve members not only span the arms 18-19 but also are in meshing interlace (see FIG. 1). A snap ring 23 in a groove 22 at one end of pintel 17 retains the valve-member hinge connection.

The arms 18-19 are shown to additionally provide a body reference for resilient application of biasing force to each of the valve members, in the valve-closing direction. To this end, separate coil springs with tangent end arms may be symmetrically mounted to the respective hinge arms 18-19, with the tangent arms at the respective ends of each such spring applying biasing force to a different one of the valve members 15-16. However, in the form shown, a single spring 24 performs these functions in a manner to assure that the biasing force applied to each valve member is symmetrically applied, with respect to the central axis of the valve body. Thus, in spring 24, a central bail-like arm 25 connects two like, but oppositely wound, coiled halves 26—26' which rest upon the respective hinge arms 18-19; the bail-like arm 25 bears upon valve member 15 symmetrically with respect to the section plane 2—2 through the axial center of body 10, and the outer tangent arms 27—27' of spring 24 also bear upon valve member 16 symmetrically with respect to the same section plane 2—2.

Not only is bias action symmetrical about the central axis, but so also is the stabilizing of full-open stop positions for the respective valve members 15-16. To this end integral stop projections 28—28' at the center of the back of valve members 15-16 are shaped and poised for limiting abutment with the downstream-projecting end of stem 13, to stabilize full-open positions suggested by phantom outline in FIG. 2.

The described valve construction will be seen to acheive all stated objects and to permit embodiment of all necessary check-valve functions in a body shell 11 of essentially minimum thickness. Since no part of the shell 11 per se is required for hinge-journal or any other hinge purpose, the thin annualr nature of shell 11 may be circumferentially continuous except for short-radius fairing of seat-post-to-shell juncture. Adequate seating overlap $\Delta_1$ is assured peripherally continuously for each valve member around the respective seat openings A-B, and at the same time a residual shoulder exposure $\Delta_2$ is available for shoulder, snap-ring or other location within a pipe or fitting bore into which the check-valve of the invention is selectively installable. Preferably, standardized construction of the character indicated is employed in a variety of outer diameters, keyed for insertion compatability with internal diameters of standard pipe sizes. Smooth contour and minimum constriction are presented to all downstream-directed flow and, except for a smooth ogival bulge 29 at the mid-section seat post 12, the latter may be as narrow as the thickness of shell 11, i.e. substantially $2\Delta_1$.

While the invention has been described in detail for a preferred form, it will be understood that modifications may be made without departure from the claimed scope of the invention. Thus, the invention is independent of the type of seal employed, or whether a seal is employed, at the seating regions. Also, it may be preferred in certain valve sizes and applications to construct the hinge-post means 14 separate from, and therefore for assembly to, the seat-post 12, as suggested by the separate such parts shown at 14'-12' in FIG. 4; in the specific case of FIG. 4, for example, a drilled central hole 30 and counterbore 31 in seat post 12' receive insert assembly of the reduced end 13" of stem 13', the latter being swedged to fill counterbore 31 and conform to the ogival contour 29 for permanent retention of the assembled parts 12'-14'.

What is claimed is:

1. A check-valve assembly, comprising an annular valve body with a fluid-flow passage bore extending therethrough between upstream and downstream ends of said body, said body having valve-seat formations including a seat post diametrically spanning the bore of said body and defining two opposed generally semicircular seat openings to share flow via said passage, hinge means carried by said post on an axis located downstream from said seat openings and parallel to said post, said hinge means having end clearance with the bore of said body, and two valve members hinged to said body via said hinge means, said valve members having a valveclosing position in coaction with said seat formations for blocking fluid flow in the upstream direction and said valve members having a valve-open position for passage of fluid flow in the downstream direction.

2. A check-valve assembly, comprising an annular valve body with a fluid-flow passage bore extending therethrough between upstream and downstream ends of said body, said body including a seat post having a seat portion diametrically spanning the bore of said body and an offset portion extending downstream from the center of said seat portion, and two valve members centrally hinged solely to said offset portion, said valve members coacting with said seat portion in checking reaction to flow in the upstream direction, and said valve members coacting with said offset portion to stabilize their valve-open positions in reaction to flow in the downstream direction.

3. A check-valve assembly, comprising a generally cylindrically annular body with a diametrically extending seat post dividing the opening of said body into two like opposed generally semicircular valve-seat openings to share fluid flow in a single downstream direction through said body, hinge-post means carried centrally of said seat post and including a formation establishing a hinge axis offset downstream from and parallel to said seat post, and two valve members hinged on said axis and connected only to said hinge-post means, said valve members coacting with said seat openings to check flow in the upstream direction, and said valve members swinging toward each other on opposite sides of said hinge-post means to pass flow in the downstream direction.

4. The assembly of claim 3, in which said hingepost means comprises a central axially extending stem and two radially outward arms extending parallel to said seat post and having pintel bores on said hinge axis, each valve member having two spaced hinge lugs with aligned pintel bores, the spacing between being greater than the end-to-end span of said arms and being less than the diametrical extent of said seat post.

5. The assembly of claim 4, and including spring means having coiled support on one of said arms and biased reaction upon both said valve members in the direction of valve-member coaction with said seat openings.

6. The assembly of claim 5, in which said spring means has coiled support on both said arms, the application of bias to each valve-member being symmetrical with respect to the central axis of said hinge-post means.

7. The assembly of claim 3, and including spring means reacting between said hinge-post means and each of said valve members and normally biasing the same toward coaction with said seat openings.

8. The assembly of claim 3, in which said seat post is an integral formation of said body.

9. The assembly of claim 3, in which said hinge-post means is an integral formation of said seat post.

10. The assembly of claim 3, in which said seat post includes central mounting means for said hingepost means, and in which said hinge-post means and valve members hinged thereto constitute a subassembly which is connected to said seat post at said mounting means.

11. The assembly of claim 3, in which said hinge-post means extends downstream from said hinge axis, and in which said valve members coact with said hinge-post means downstream of said hinge axis to determine stabilized full-open positions of said valve members.

* * * * *